(12) United States Patent
Brice, Jr. et al.

(10) Patent No.: US 8,001,544 B2
(45) Date of Patent: Aug. 16, 2011

(54) METHOD AND STORAGE MEDIUM FOR VIRTUALIZATION OF DEVICE SELF-DESCRIPTION INFORMATION USING IN-TRANSIT MODIFICATION

(75) Inventors: Frank W. Brice, Jr., Hurley, NY (US); Mark P. Gardiner, Delmar, NY (US); Gustav E. Sittmann, III, Webster Groves, MO (US); Stephen G. Wilkins, Endwell, NY (US); Harry M. Yunderfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1356 days.

(21) Appl. No.: 11/282,254

(22) Filed: Nov. 18, 2005

(65) Prior Publication Data

US 2007/0118834 A1 May 24, 2007

(51) Int. Cl.
G06F 9/455 (2006.01)
G06F 15/177 (2006.01)
G06F 3/00 (2006.01)
(52) U.S. Cl. .................. 718/1; 709/221; 710/8
(58) Field of Classification Search ........... 718/1; 710/8
See application file for complete search history.

(56) References Cited

U.S. PATENT DOCUMENTS

| | | | | |
|---|---|---|---|---|
| 5,600,805 | A * | 2/1997 | Fredericks et al. | 710/5 |
| 5,996,026 | A * | 11/1999 | Onodera et al. | 710/3 |
| 6,338,151 | B1 * | 1/2002 | Yudenfriend et al. | 714/47 |
| 6,345,241 | B1 | 2/2002 | Brice et al. | 703/21 |
| 6,698,017 | B1 * | 2/2004 | Adamovits et al. | 717/168 |
| 6,748,388 | B1 | 6/2004 | Kasamsetty et al. | 707/10 |
| 2002/0099752 | A1 | 7/2002 | Markos et al. | 709/1 |
| 2004/0054785 | A1 * | 3/2004 | Driever et al. | 709/228 |
| 2005/0240932 | A1 * | 10/2005 | Billau et al. | 718/104 |
| 2006/0248528 | A1 * | 11/2006 | Oney et al. | 718/1 |

OTHER PUBLICATIONS

Enterprise Systems Architecture/390: Common I/O-Device Commands and Self Description 3$^{rd}$ Edition; Aug. 1995; IBM Corporation.

* cited by examiner

*Primary Examiner* — Kenneth Tang
(74) *Attorney, Agent, or Firm* — Cantor Colburn LLP; William A. Kinnaman, Jr

(57) ABSTRACT

A method for changing self-description data of a functional device in a computing system. The method may include virtualizing the functional device to create a virtual functional device, and adding, changing, or removing information in the self-description information sent from a functional device as a part of virtualization of the device by a hypervisor. Changing the self-description data of the functional device occurs after the self-description data has left the functional device.

7 Claims, 2 Drawing Sheets

METHOD AND STORAGE MEDIUM FOR VIRTUALIZATION OF DEVICE SELF-DESCRIPTION INFORMATION USING IN-TRANSIT MODIFICATION

BACKGROUND OF THE INVENTION

1. Field of the Invention

Embodiments of this invention relate to a method and storage medium for the virtualization of device self-description information in a computing system through modification of the information during its transit from a functional device to a program (specifically, an operating system) to which the device is virtualized.

2. Description of the Related Art

Embodiments of this invention solve problems arising from a program having an incomplete view of a functional device, in particular a virtualized device, or a device on a data path that imparts certain characteristics of interest to the program. Device self-description data comes from a functional device and describes that device, but such description cannot take account of characteristics that are changed through virtualization of the device by a hypervisor that presents a virtual image of the device to the program.

In addition, there may be characteristics of the data path that would be useful for the program to know, but which cannot be included in the self-description data by the device itself.

A virtual device is a device that appears to the program as a separate entity, but may be a portion of a shared real (physical or logical) device or be totally simulated by a hypervisor.

A hypervisor, sometimes referred to as a virtualization manager, is a software program or machine firmware that instantiates virtual machines (i.e., virtual images of a real machine), allowing multiple operating systems, which can include different operating systems or multiple instances of the same operating system, to share a single hardware computer system that includes one or more processors, or engines. A hypervisor also supports resource partitioning and dynamic resource movement across multiple operating system environments.

A hypervisor must be designed for a particular processor architecture, such as IBM's z/Architecture, IBM's POWER architecture, or Intel's x86 architecture. Each operating system running under the control of a hypervisor appears to have processor, memory, and other resources all to itself. However, the hypervisor actually controls the real processor and its resources, allocating them to each operating system on demand and/or by policy.

Because an operating system is often used to run a particular application or set of applications in a dedicated hardware server, the use of a hypervisor can make it possible to run multiple operating systems (and their applications) in a single such server, reducing overall hardware costs. Production and test systems can run at the same time on the same hardware.

The IBM z/Architecture provides a specific command by which an operating system (hereinafter called the program) may request self-description information from a connected input/output (I/O) device. The command is called Read Configuration Data (RCD), and the selected device returns architecturally-defined data in a configuration record. Each element comprising the logical device is described by (i) a node-element descriptor (NED), (ii) an emulation NED (when the device emulates another type of device), (iii) one or more specific node-element qualifiers (NEQ), (iv) a token NED that relates one device to another when they share a hardware subsystem, and (v) a general NEQ. This architecture is described in the IBM publication entitled ESA/390 *Common I/O-Device Commands and Self Description*, order number SA22-7204-02.

Existing virtualization systems may provide an operating system with self-description information that gives an incomplete view of some or all of the I/O devices. Therefore, it is desired to provide a method of intercepting self-description information that is read by the program in a virtual machine from a functional device, and altering that information before delivering the information to the virtual machine.

BRIEF SUMMARY OF THE INVENTION

An embodiment of the invention is a method for changing self-description data of a functional device in a computing system. The method includes virtualizing the functional device to create a virtual functional device and adding, changing, or removing information in the self-description information sent from the functional device as part of the virtualization of the device by a hypervisor. Changing the self-description data of the functional device occurs after the self-description data has left the functional device.

An alternative embodiment of the invention is a method for changing self-description data of a functional device in a computing system. The method includes intercepting the self-description data read by one or more programs, altering the self-description data, and transmitting the altered self-description data to the one or more programs.

BRIEF DESCRIPTION OF THE DRAWINGS

Further features, aspects and advantages of the apparatus and methods of the present invention will become better understood with regard to the following description, appended claims, and accompanying drawing where:

DETAILED DESCRIPTION OF THE INVENTION

Embodiments of the invention relate generally to the field of computer architecture and, more specifically, to methods and systems for managing resources among multiple operating system images ("guest" operating systems) within a logically partitioned and/or virtualized data processing system. Embodiments of the invention solve problems arising from a guest operating system having an incomplete view of an I/O device, in particular a virtualized device or a device with certain characteristics of the data-path to the device. Specifically, embodiments of the invention describe a method of intercepting self-description information that is read by the program in a virtual machine (the guest operating system) from a functional device, and altering that information before delivering it to the program.

Embodiments of the invention are enhancements of virtualization and device self-description in a computing system. The embodiments of this invention provide for improved virtualization of a self-describing device, perhaps into several virtual devices, by providing information about the virtualization to the program(s) that use the virtual device(s).

A further extension provides for modification of self-description data that is in transit from the device to the program, to add information about one or more elements of the data path that are otherwise not apparent to the program.

The embodiments of this invention apply to any computing system in which a program can request self-description information from externally or internally connected distinct functional devices. For purposes of illustration, the embodiments of the invention are described here in the context of IBM's z/Architecture and the IBM System z9 computers that implement that architecture.

In particular, the embodiments of the invention describe a method of a hypervisor intercepting self-description information that is read by the program in a virtual machine from a functional device and altering that information, before delivering the information to the program. This allows the hypervisor to supply device self-description information that more-accurately describes a virtual device being simulated through the use of all or a portion of a functional device.

In other words, the changing of the self-description data of a functional device in a computing system occurs after the self-description data has left the storage controller for the device and before the self-description data is received by a requesting program in a virtual machine.

Figure 1:
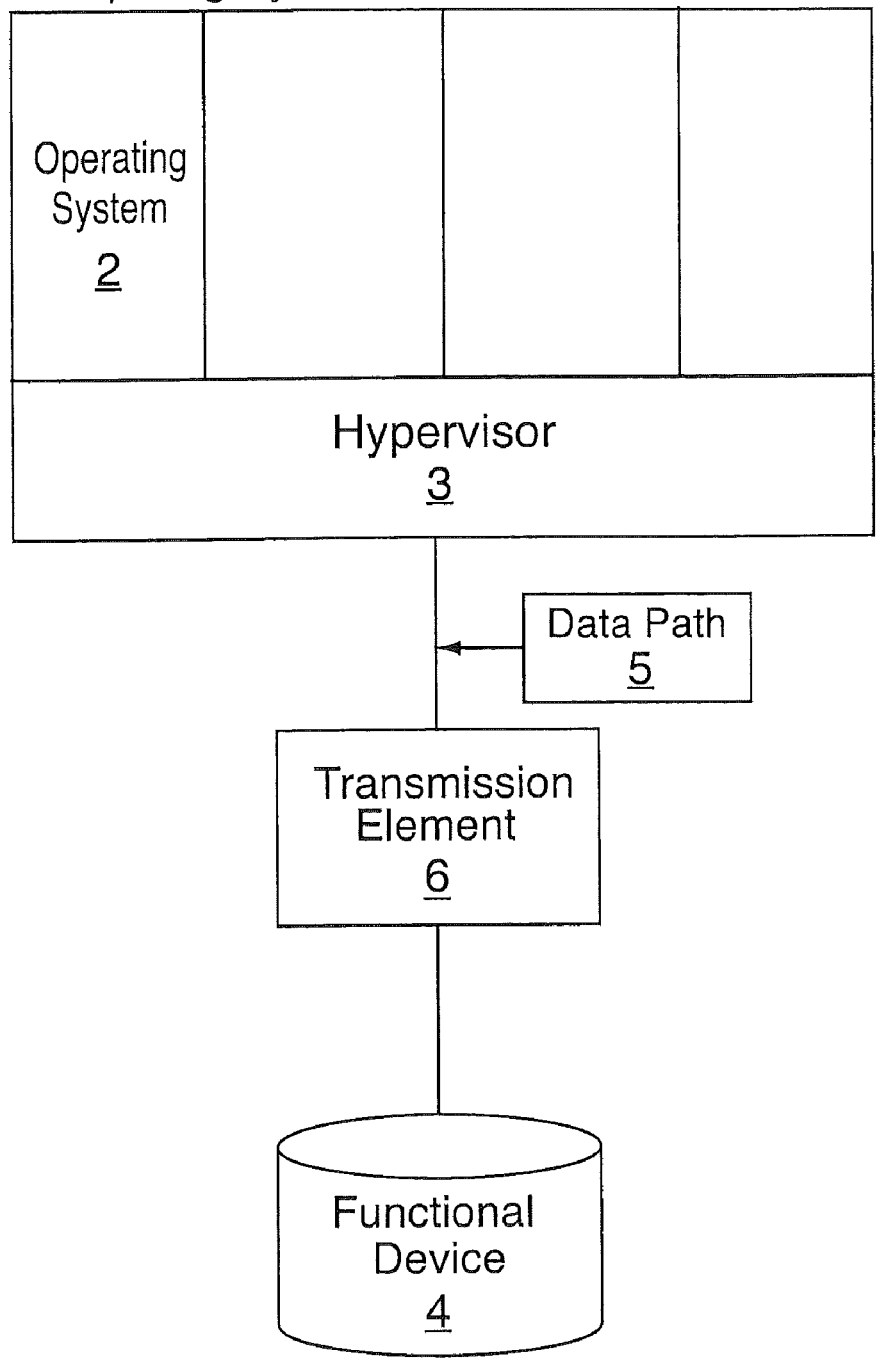
FIG. 1 shows a computing system with a hypervisor and several operating systems, a self-describing functional device, and a data path containing a transmission element.

The embodiments of the invention deal with the flow of self-description information to the program from a device as described in FIG. 1. In the computing system 1 of FIG. 1, comprising a hypervisor 3 and several guest operating systems such as the program 2 under the control of the hypervisor, the embodiments of this invention recognize that there may be "transparent" elements between the program that issues the Read Configuration Data (RCD) command and the functional device 4 reporting its own description. That is, there may be elements that are not apparent to the program but that might affect the operation of the program or its perception of the self-describing device.

One such key element is the hypervisor itself, a program or machine firmware that creates virtual images of the computer system and its connected functional devices (i.e., virtual machines and virtual devices, respectively). In other words, a hypervisor program or computing-system firmware can add, change, or remove information within the self-description data of the functional device in support of the creation of one or more virtual images of the self-describing device.

With this technology, the hypervisor can run many operating systems concurrently on the computing system while sharing and optimizing the use of real resources. The hypervisor can provide unique identification for each of the virtual images of the functional device.

In virtualizing a functional device, a hypervisor alters the view of reality that the program sees. In particular, different programs might be permitted to see only specific (perhaps different) portions of a disk device, called minidisks in the parlance of IBM's z/NVM hypervisor.

Another example of a hypervisor-altered view of a disk device is a virtual disk having cylinders or blocks of which the program is aware but to which the program does not have access, perhaps because those cylinders or blocks do not exist on the real device. Such a construct can be useful in testing storage addressability in a program with a (virtual) disk of a certain size to ensure that the program correctly handles such a size, but for which test the program does not need the storage capacity implied by that size.

To accurately and usefully describe such virtual devices to the program, the present application proposes the injection of one or more virtual-device specific NEQs by the hypervisor into the self-description configuration record provided by the functional device, before the record is presented to the program.

Since the RCD command and the resulting configuration record flow through the hypervisor before reaching the program, the hypervisor has the opportunity to modify the configuration record. An injected virtual-device specific NEQ qualifies the information in the device NED that is adjacent to the NEQ in the configuration record.

Thus the virtual-device specific NEQs injected by the hypervisor, in combination with the applicable device NED and any specific NEQs provided by the functional device, describe the device as it has been virtualized to the program.

The interception of the self-description information that is read from a functional device by the program in a virtual machine, the alteration of the self-description information, and the delivery of the information to the program allows the hypervisor to supply self-description information that more-accurately describes a virtual device being simulated through the use of all or a portion of a functional device.

The embodiments of the invention can be extended beyond device virtualization by a hypervisor, to provide for descriptions of transmission elements of the data path 5 between a device and a program. A data-transmission element of a data path may add information into the self-description data of the virtual device while the self-description data is in transit through the data-transmission element. The data transmission element indicates its presence in the data path and provides such indication to the computing system. The data path 5 may include one or more transmission elements 6 that are virtualized. One type of transmission element 6 between a program and a self-describing device, not normally apparent to the program, is a channel-extender, which can be used when there is great physical distance between a computer and a device.

As a result, the configuration record passes through the channel extender before reaching the program in a virtual machine, providing the opportunity for the channel extender to modify the configuration record.

Accordingly, this embodiment of the invention proposes the injection of an NED during transit of the configuration record through certain elements of the data path, such as a channel extender.

A hypervisor provides a virtualization of, for example, the IBM z/Architecture. It does this through a combination of three major precepts of virtualization: (1) resource sharing, (2) resource simulation, and (3) controlling the provisioning and management of multiple virtualized systems, or virtual machines.

Real resources are provisioned as virtual resources to a virtual machine by the hypervisor. Real resources can be shared in time (for example, the CPU), shared in space by different physical allocations (for example, memory or disk space), or shared concurrently in time and space (for example, shared disk space).

Resources can be virtual or real and include CPU time, memory, and I/O devices, including terminals, tape drives, disks, printers and network devices (network interface cards and switches).

I/O is provided through actualization and virtualization. Some devices are completely virtualized. In other words, the devices don't physically exist. Rather, the hypervisor provides the simulation of the I/0 commands for the device, and stores the data in memory or disk buffers.

Other I/0 devices are actualized by sharing. Consider the situation where one real disk contains roughly 3-gigabytes of space. A virtual machine might have a much smaller space requirement, say, 50 megabytes. Rather than devoting all of a 3 gigabyte disk to a virtual machine and wasting most of the disk space, a disk can be carved into smaller units known as minidisks. When a program in a virtual machine reads or writes a file on a minidisk, the hypervisor translates the disk commands to the correct locations on the real disk.

In the case of a minidisk, the virtual-device specific NEQ can be used to provide unique worldwide identification of the minidisk. Each logical disk device reports its unique serial number in the device NED. When such a device is virtualized into some number of minidisks, each of the minidisks will appear to have the same serial number and thus might be taken to be the same device by the program in a virtual machine. A hypervisor-injected virtual-device specific NEQ can be used to provide additional identifying information to the program, such that each minidisk appears unique.

In the preferred embodiment, the virtual-device specific NEQ contains the starting and ending cylinder or block numbers of the minidisk, though the cylinder or block numbers are not identified as such to the program. Rather, these values are used by the program as unique identifiers of the minidisks. An advantage of this choice is that the resulting unique identifier for each minidisk is the same for all hypervisors (and hence all virtual machines created by such hypervisors) that may be sharing the functional device, leading to common identification of the shared space comprising the minidisk by all sharers.

In the case of inaccessible cylinders or blocks, the hypervisor creates the illusion of a very large disk containing cylinders or blocks that are not really there. In the aforementioned case of testing the programming of addressability of large disks, the large disks may not be readily available.

The program does not need the storage of a large disk in order to test the program's support for large disks, but rather needs only the cylinders or blocks at the beginning and the end of the virtually-large disk. Hence only a small number of cylinders or blocks need backing by real memory or disk storage. The hypervisor-injected virtual-device specific NEQ identifies the cylinders or blocks to which the program has no access, and the program thereby avoids attempting to access such cylinders or blocks. Alternatively, the converse could be implemented: the specific NEQ could identify the cylinders or blocks to which the program has access, and the program avoids attempting to access any other cylinders or blocks.

Therefore, the hypervisor creates a virtual image of a storage device in which the virtual image contains one or more non-accessible "gaps" that are not backed by storage in the real storage device. Although the full range of cylinders or blocks of the virtually-large device seem available to the program, the hypervisor backs only a subset of that range of addressable storage with the real resource, indicating to the program that a number of cylinders or blocks within the addressability of the virtual device cannot be used.

In the case of the channel extender, awareness of the channel extender by the program can be useful because the extended distance can have effects on the data-link protocols and timing. By seeing the presence of an injected channel-extender NED, the program can adapt its operation with the self-describing device accordingly.

One example is for the program to be tolerant of time-out conditions that may occur due to network congestion and the extra round-trip distance over which the data-link protocols must function.

These embodiments illustrate the usefulness of the injection of NEDs and specific NEQs into the configuration records supplied by self-describing devices. In particular, the embodiments of the invention make a significant contribution to device virtualization. Although the preferred embodiments are described in terms of IBM's z/Architecture and System z9 computers, the invention can be applied across the spectrum of computing systems and various forms of device self-description.

Figure 2:
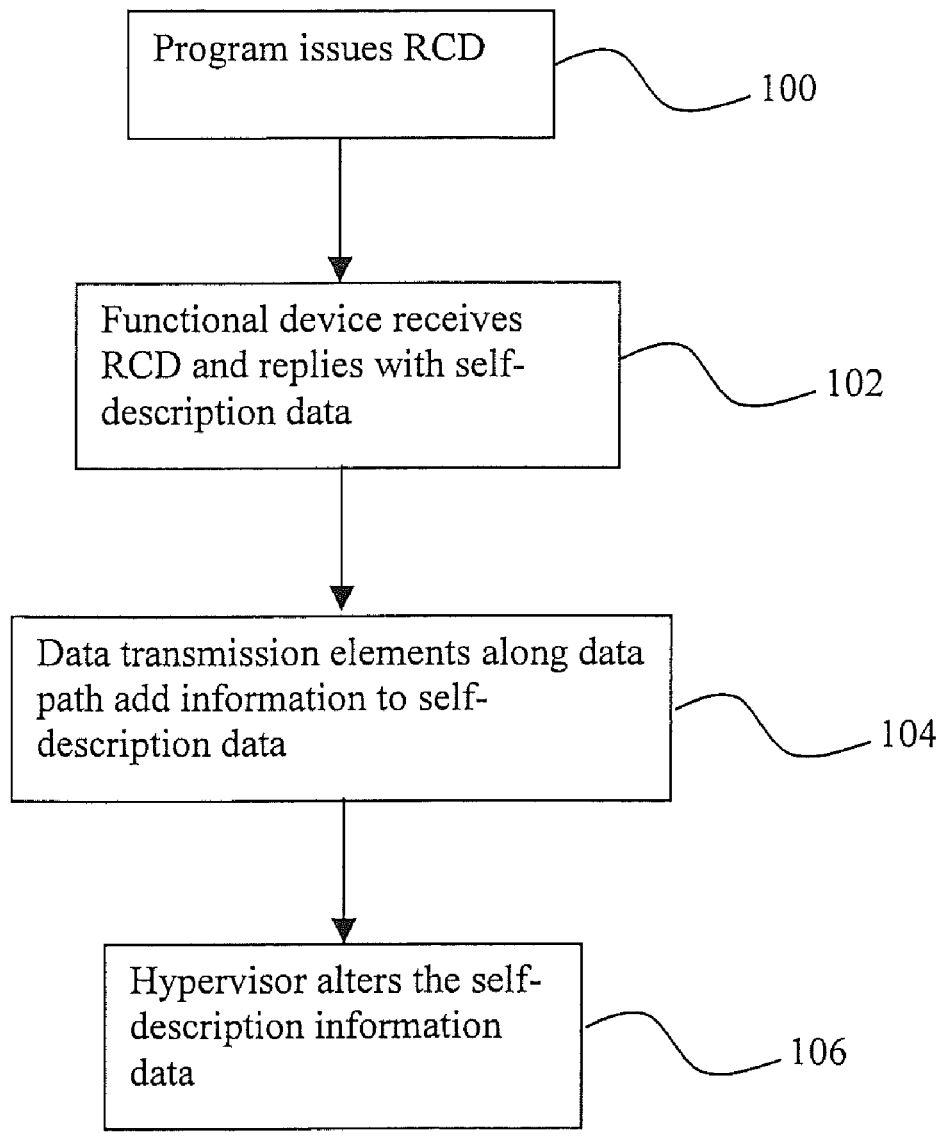
FIG. 2 is a flowchart of processing.

FIG. 2 is a flowchart of exemplary processing in the system of FIG. 1. At 100, a program such as operating system 2 issues the RCD. At 102, the functional device 4 receives the RCD and replies with self-description information (e.g., NED and any specific NEQs) related to the functional device 4. At 104, data transmission elements 6 along the data path 5 may add information into the self-description information. At 106, the hypervisor 3 receives the self-description information (and any information from data transmission elements) and alters the self-description information to be consistent with the virtual image related to the program.

As described above, the invention may be embodied in the form of computer-implemented processes and apparatus for practicing those processes. The invention may also be embodied in the form of computer program code containing instructions on tangible media, such as system memory, CD-ROMs, disks, or any other computer-readable storage medium wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation wherein, when the computer program code is loaded into and executed by a computer, the computer becomes an apparatus for practicing the invention. When implemented on a general-purpose processor, the computer program code segments configure the processor to create specific logic events.

While the invention has been particularly shown and described with respect to illustrative and preformed embodiments thereof, it will be understood by those skilled in the art that the foregoing and other changes in form and details may be made therein without departing from the spirit and scope of the invention, which should be limited only by the scope of the appended claims.

The invention claimed is:

1. A method for changing self-description data of a functional device in a computing system, the method comprising:
   virtualizing the functional device to create a virtual functional device; and
   adding, changing, or removing information in the self-description data sent from the functional device as part of the virtualization of the device by a hypervisor;
   wherein adding, changing, or removing of the self-description data of the functional device occurs during transit from the functional device to the one or more programs;
   wherein a specific node element qualifier (NEQ) is injected into a self-description configuration record provided by the functional device before the record is presented to the program in a virtual machine, to create a virtualized configuration record;
   creating a virtual image of a storage device in which the virtual image presents a contiguous range of storage addresses, some of those addresses are for storage that is not accessible, and the accessible areas are non-contiguous areas in the virtual image while being contiguous areas in the functional device;
   wherein the storage device is a disk device or a minidisk, the disk device or minidisk having a number of cylinders or blocks, of which the one or more programs is aware and cannot access;
   wherein each disk device or each minidisk has one or more unique specific node element qualifiers (NEQ);

wherein each specific NEQ has a starting cylinder or block number and an ending cylinder or block number for each minidisk.

2. The method according to claim 1, wherein information about the data-transmission element of a data path is added into information of the self-description data of the functional device while the self-description data is in transit through the transmission element.

3. The method according to claim 1, wherein the device has been virtualized into one or more virtual images by the hypervisor that may add, change, or remove information within the self-description data of the functional device in support of the use of one or more of the virtual images of the functional device by the program in one or more virtual machines.

4. The method according to claim 3, wherein the hypervisor provides unique identification for the one or more virtual images of the functional device.

5. The method according to claim 1, wherein the hypervisor creates a virtual image of a storage device in which the virtual image presents a contiguous range of storage addresses, some of those addresses are for storage that is not accessible, and the accessible areas are non-contiguous areas in the virtual image while being contiguous areas in the functional device.

6. The method according to claim 5, wherein the hypervisor creates an acceptable range of addressable storage in the virtual image of the storage device by indicating to a program that a subset of the addresses are not available or only a subset of the addresses are available.

7. A computer program product for changing self-description data of a functional device in a computing system, the computer program product comprising:

a storage medium; and program instructions stored on the storage medium for performing the method of claim 1.

* * * * *